(12) United States Patent
Koga et al.

(10) Patent No.: US 9,699,336 B2
(45) Date of Patent: Jul. 4, 2017

(54) FUNCTION SETTING DEVICE AND IMAGE FORMING APPARATUS

(71) Applicant: FUJI XEROX CO., LTD., Tokyo (JP)

(72) Inventors: Takahisa Koga, Kanagawa (JP); Guodong Wang, Kanagawa (JP); Takeshi Ichimura, Kanagawa (JP); Tomohito Takagi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/046,886

(22) Filed: Feb. 18, 2016

(65) Prior Publication Data

US 2016/0165082 A1    Jun. 9, 2016

Related U.S. Application Data

(63) Continuation of application No. 14/633,675, filed on Feb. 27, 2015, which is a continuation of application (Continued)

(30) Foreign Application Priority Data

Apr. 10, 2013   (JP) ................................. 2013-082074

(51) Int. Cl.
  *H04N 1/00*    (2006.01)
  *G06K 15/02*   (2006.01)
  *G06F 3/0482*  (2013.01)

(52) U.S. Cl.
  CPC ....... *H04N 1/00514* (2013.01); *G06F 3/0482* (2013.01); *G06K 15/02* (2013.01);
  (Continued)

(58) Field of Classification Search
  CPC .................................................. G09G 2320/08
  (Continued)

(56) References Cited

U.S. PATENT DOCUMENTS 6,021,312 A *  2/2000  Klein ..................... G08B 5/224
                                                 340/7.55
7,251,790 B1 *  7/2007  Drucker ............ G06F 17/30849
                                                 348/333.05
(Continued)

FOREIGN PATENT DOCUMENTS

JP    H06-35282 A    2/1994
JP    H07-201168 A   8/1995
(Continued)

OTHER PUBLICATIONS

Jun. 28, 2016 Office Action issued in Japanese Patent Application No. 2013-082074.

*Primary Examiner* — Thomas Lett
(74) *Attorney, Agent, or Firm* — Oliff PLC

(57) ABSTRACT

A function setting device includes a first operator and a second operator. The first operator is operated for selecting one function item from among plural function items forming a first menu and for setting the selected function item and for then selecting one function value from among plural function values of the set function item forming a second menu and for setting the selected function value, the second menu being provided for each function item. One function item is assigned to the second operator. The second operator sets the selection of the assigned function item when the second operator is operated for the first time and selects one function value from among plural function values of the set function item forming the second menu every time the second operator is operated for a subsequent time.

7 Claims, 12 Drawing Sheets

Related U.S. Application Data

No. 14/056,489, filed on Oct. 17, 2013, now Pat. No. 8,988,695.

(52) U.S. Cl.
CPC ....... H04N 1/0035 (2013.01); H04N 1/00411 (2013.01); H04N 1/00413 (2013.01); H04N 1/00474 (2013.01); H04N 2201/0094 (2013.01)

(58) Field of Classification Search
USPC ....................................................... 358/1.13
See application file for complete search history.

(56) References Cited

U.S. PATENT DOCUMENTS

| | | | | |
|---|---|---|---|---|
| 2004/0090543 | A1* | 5/2004 | Suehiro | H04N 1/00265 348/231.99 |
| 2007/0041055 | A1 | 2/2007 | Kotani | |
| 2008/0022212 | A1 | 1/2008 | Kodimer et al. | |
| 2009/0009806 | A1 | 1/2009 | Matsuda | |
| 2010/0046977 | A1 | 2/2010 | Inenaga et al. | |
| 2010/0218093 | A1* | 8/2010 | Sakamoto | H04N 1/0044 715/274 |

FOREIGN PATENT DOCUMENTS

| | | |
|---|---|---|
| JP | H11-134156 A | 5/1999 |
| JP | 2000-165574 A | 6/2000 |
| JP | 2002-149011 A | 5/2002 |
| JP | 2003-107963 A | 4/2003 |
| JP | 2004-072781 A | 3/2004 |
| JP | 2005-074717 A | 3/2005 |
| JP | 3761306 B2 | 3/2006 |
| JP | 2007-059983 A | 3/2007 |
| JP | 2007-068040 A | 3/2007 |
| JP | 2009-009234 A | 1/2009 |
| JP | 2009-225184 A | 10/2009 |

* cited by examiner

FIG. 10A

| TRAY | TRAY 1 A4 LANDSCAPE |
|---|---|
| ZOOM | 1:1 |
| DOCUMENT TYPE | TEXT |
| DENSITY | NORMAL |
| DUPLEX | SINGLE-SIDED → SINGLE-SIDED |
| SORT | SORT |
| ⋮ | ⋮ |

(A)

→ COPY 1 →

FIG. 10B

| TRAY | TRAY 1 A4 LANDSCAPE |
|---|---|
| ZOOM | 1:1 |
| DOCUMENT TYPE | TEXT |
| DENSITY | NORMAL |
| DUPLEX | SINGLE-SIDED → SINGLE-SIDED |
| SORT | SORT |
| ⋮ | ⋮ |

(B1)

→ COPY 2 →

FIG. 10C

| TRAY | TRAY 1 A4 LANDSCAPE |
|---|---|
| ZOOM | 1:1 |
| DOCUMENT TYPE | TEXT |
| DENSITY | NORMAL |
| DUPLEX | SINGLE-SIDED → SINGLE-SIDED |
| SORT | SORT |
| ⋮ | ⋮ |

(C1)

| TRAY | TRAY 1 A4 LANDSCAPE |
|---|---|
| ZOOM | 1:1 |
| DOCUMENT TYPE | TEXT |
| DENSITY | NORMAL |
| DUPLEX | SINGLE-SIDED → SINGLE-SIDED |
| SORT | SORT |
| ⋮ | ⋮ |

(B2)

| TRAY | TRAY 1 A4 LANDSCAPE |
|---|---|
| ZOOM | 1:1 |
| DOCUMENT TYPE | TEXT |
| DENSITY | SLIGHTLY DARK |
| DUPLEX | SINGLE-SIDED → SINGLE-SIDED |
| SORT | SORT |
| ⋮ | ⋮ |

(C2)

| TRAY | TRAY 1 A4 LANDSCAPE |
|---|---|
| ZOOM | 1:1 |
| DOCUMENT TYPE | TEXT |
| DENSITY | SLIGHTLY DARK |
| DUPLEX | SINGLE-SIDED → SINGLE-SIDED |
| SORT | SORT |
| ⋮ | ⋮ |

(B3)

← COPY 3 ←

| TRAY | TRAY 1 A4 LANDSCAPE |
|---|---|
| ZOOM | 1:1 |
| DOCUMENT TYPE | TEXT |
| DENSITY | SLIGHTLY DARK |
| DUPLEX | SINGLE-SIDED → SINGLE-SIDED |
| SORT | SORT |
| ⋮ | ⋮ |

(C3)

→ COPY 4 →

| TRAY | TRAY 1 A4 LANDSCAPE |
|---|---|
| ZOOM | 1:1 |
| DOCUMENT TYPE | TEXT |
| DENSITY | NORMAL |
| DUPLEX | SINGLE-SIDED → SINGLE-SIDED |
| SORT | SORT |
| ⋮ | ⋮ |

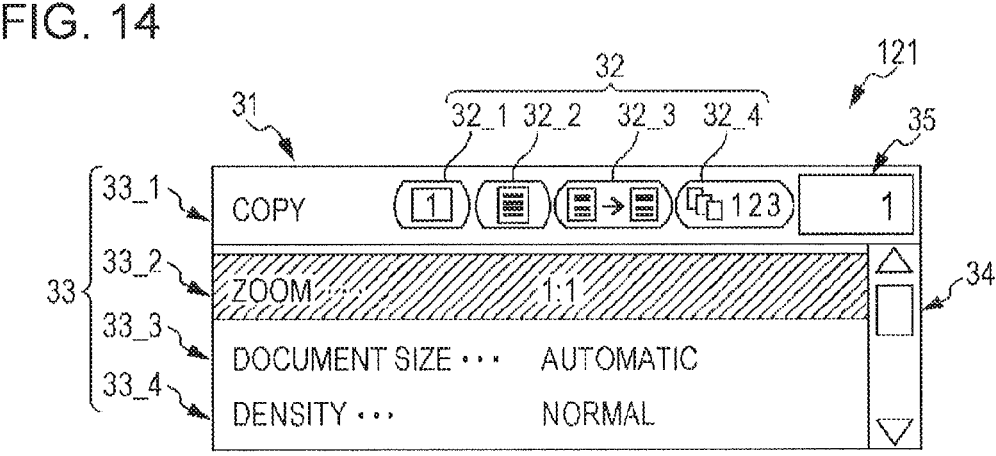

FIG. 15

| BUTTON | COPY MODE | SCAN MODE | FAX MODE |
|---|---|---|---|
| DIRECT KEY (DENSITY) | DENSITY | DENSITY | DENSITY |
| DIRECT KEY (DOCUMENT TYPE) | DOCUMENT TYPE | DOCUMENT TYPE | DOCUMENT TYPE |
| DIRECT KEY (DUPLEX) | DUPLEX | DUPLEX | DUPLEX |
| DIRECT KEY (SORT/RESOLUTION) | SORT | RESOLUTION | RESOLUTION |

FIG. 16

| BUTTON | COPY MODE | SCAN MODE | FAX MODE |
|---|---|---|---|
| DIRECT KEY (DENSITY) | TRAY | DENSITY | DENSITY |
| DIRECT KEY (DOCUMENT TYPE) | DOCUMENT TYPE | DOCUMENT TYPE | DOCUMENT TYPE |
| DIRECT KEY (DUPLEX) | DUPLEX | DUPLEX | DUPLEX |
| DIRECT KEY (SORT/RESOLUTION) | SORT | RESOLUTION | RESOLUTION |

FIG. 20

| BUTTON | (A) FIRST COMPARATIVE EXAMPLE (MENU) | | | | | (B) SECOND COMPARATIVE EXAMPLE (DIRECT KEY) | | | | (C) EXEMPLARY EMBODIMENT | | |
|---|---|---|---|---|---|---|---|---|---|---|---|---|
| OPERATION STEP | CURSOR KEY (DOWN) | CURSOR KEY (DOWN) | SETTING KEY | CURSOR KEY (DOWN) | SETTING KEY | DIRECT KEY (DENSITY) | CURSOR KEY (DOWN) | SETTING KEY | DIRECT KEY (DENSITY) | DIRECT KEY (DENSITY) | DIRECT KEY (DENSITY) | SETTING KEY |
| | FIVE STEPS / THREE TIMES | | | | | FOUR STEPS / THREE TIMES | | | | THREE STEPS / ONCE | | |

FUNCTION SETTING DEVICE AND IMAGE FORMING APPARATUS

CROSS REFERENCE TO RELATED APPLICATIONS

This is a Continuation of application Ser. No. 14/633,675 filed Feb. 27, 2015, which in turn is a Continuation of application Ser. No. 14/056,489, filed Oct. 17, 2013, which claims the benefit of Japanese Application No. 2013-082074 filed Apr. 10, 2013. The disclosure of the prior applications is hereby incorporated by reference herein in its entirety.

BACKGROUND

The present invention relates to a function setting device and an image forming apparatus.

SUMMARY

According to an aspect of the invention, there is provided a function setting device including a first operator and a second operator. The first operator is operated for selecting one function item from among plural function items forming a first menu and for setting the selected function item and for then selecting one function value from among plural function values of the set function item forming a second menu and for setting the selected function value, the second menu being provided for each function item. One function item is assigned to the second operator. The second operator sets the selection of the assigned function item when the second operator is operated for the first time and selects one function value from among plural function values of the set function item forming the second menu every time the second operator is operated for a subsequent time.

BRIEF DESCRIPTION OF THE DRAWINGS

An exemplary embodiment of the present invention will be described in detail based on the following figures, wherein:

FIGS. 10A through 10C show a change in the content of a memory as a function value is being selected and set;

FIG. 14 shows a basic screen which is redisplayed;

FIG. 15 shows an assignment table in which function items are assigned to direct keys;

FIG. 16 shows an assignment table in which function items are assigned to direct keys;

FIG. 20 is a table indicating the number of operation steps necessary to change a function value.

DETAILED DESCRIPTION OF EMBODIMENTS

An exemplary embodiment of the present invention will be described below.

Figure 1:
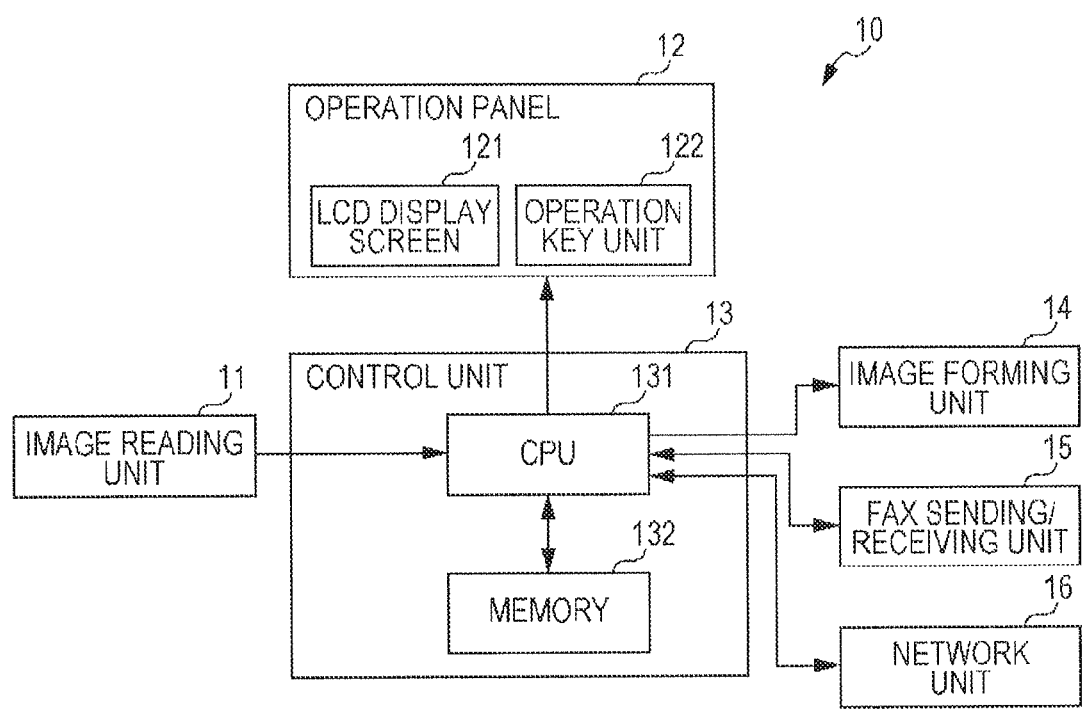
FIG. 1 is a block diagram of an example of a multifunction device.

FIG. 1 is a block diagram of an example of a multifunction device 10.

The multifunction device 10 shown in FIG. 1 corresponds to an example of each of a function setting device and an image forming apparatus according to an exemplary embodiment of the present invention.

The multifunction device 10 shown in FIG. 1 includes an image reading unit 11, an operation panel 12, a control unit 13, an image forming unit 14, a fax sending/receiving unit 15, and a network unit 16.

The image reading unit 11 reads an image from a document and generates image data. The image data generated by the image reading unit 11 is temporarily stored in a memory 132 forming the control unit 13.

The operation panel 12 includes a liquid crystal display (LCD) display screen 121 and an operation key unit 122.

On the LCD display screen 121, various screens, which will be discussed later, are displayed. The operation key unit 122 is a set of numerous keys shown in FIG. 2, which will be discussed later. The numerous keys are press buttons used for setting function items or function values on a screen displayed on the LCD display screen 121.

A function value associated with each function item which has been set on the operation panel 12 is stored in the memory 132 of the control unit 13.

The control unit 13 includes a central processing unit (CPU) 131 and the above-described memory 132.

In the memory 132, a program executed by the CPU 131, function values associated with individual function items which have been set on the operation panel 12, etc. are stored. In the memory 132, image data is also temporarily stored. The CPU 131 executes the program stored in the memory 132 and also controls the individual units of the multifunction device 10 in accordance with the function values of the associated function items stored in the memory 132.

The image forming unit 14 is a unit which forms, on a sheet, an image based on image data temporarily stored in the memory 132. In this example, as the image forming unit 14, the use of an electrophotographic image forming unit is assumed. However, the image forming unit 14 is not restricted to an electrophotographic type, and may be an image forming unit utilizing another image forming method, such as an ink-jet method.

The fax sending/receiving unit 15 is a unit that is connected to a telephone line so as to send and receive faxes. The multifunction device 10 has a fax mode. In the fax mode, image data obtained by reading an image by the image reading unit 11 is temporarily stored in the memory 132. The image data is then sent to the fax sending/receiving unit 15 and is faxed from the fax sending/receiving unit 15.

When receiving a fax, image data sent via a telephone line is received and is temporarily stored in the memory 132. Then, at the time when the image forming unit 14 is available, an image based on this image data is formed on a sheet in the image forming unit 14. Fax reception is performed even while the multifunction device 10 is operating in a mode other than the fax mode.

The network unit 16 is a unit which is connected to a communication network and sends and receives image data to and from a personal computer (hereinafter simply referred to as a "PC") connected to the same communication network.

The multifunction device 10 shown in FIG. 1 also has a scan mode. In the scan mode, image data obtained by reading an image by the image reading unit 11 is sent to the network unit 16 through the use of the memory 132, and the image data is sent from the network unit 16 to the PC.

The multifunction device 10 shown in FIG. 1 also has a copy mode, as well as the above-described fax mode and scan mode. In the copy mode, image data obtained by reading an image by the image reading unit 11 is temporarily stored in the memory 132 and is then sent to the image forming unit 14. Then, in the image forming unit 14, an image based on the image data is formed on a sheet.

Figure 2:
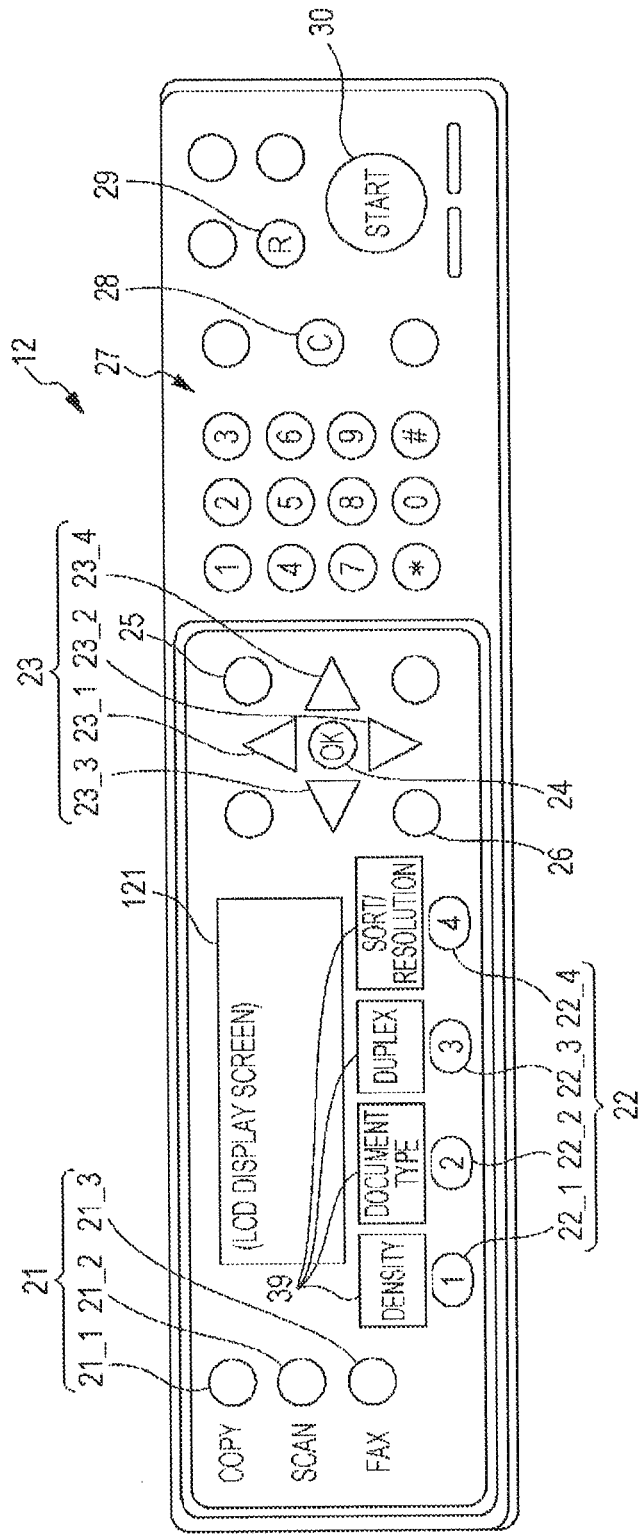
FIG. 2 shows an operation panel forming the multifunction device shown in FIG. 1.

FIG. 2 shows the operation panel 12 mounted on the multifunction device 10 shown in FIG. 1.

The LCD display screen 121 shown in FIG. 1 and numerous keys (operation key unit 122) are shown in FIG. 2.

The LCD display screen 121 is a small area display screen which displays information for four lines, as shown in FIGS. 3 through 9, 11 through 14, and 17.

The operation key unit 122 indicated by a single block in FIG. 1 includes various keys, which will be discussed below.

On the operation panel 12 shown in FIG. 2, mode switch keys 21 including a mode switch key (copy) 21_1, a mode switch key (scan) 21_2, and a mode switch key (fax) 21_3 are provided.

The mode switch key (copy) 21_1, the mode switch key (scan) 21_2, and the mode switch key (fax) 21_3 are press buttons for switching the multifunction device 10 shown in FIG. 1 to a copy mode, a scan mode, and a fax mode, respectively.

On the operation panel 12 shown in FIG. 2, four direct keys 22 including a direct key (density) 22_1, a direct key (document type) 22_2, a direct key (duplex) 22_3, and a direct key (sort/resolution) 22_4, which are examples of a second operator, are also provided. The direct keys 22 are constituted by press buttons. Function items indicated in the above-described parentheses are assigned to the direct keys 22. The direct keys of this exemplary embodiment are units implementing the following function. When a direct key is pressed, a function item assigned to this direct key is selected and set, and a direct key is also used for setting a function value of a function item. Details of the functions assigned to the direct keys 22 will be discussed later.

Indentations 39 are formed above the direct keys 22 on the operation panel 12 shown in FIG. 2. Names of function items (e.g., "density") which are initially assigned to the associated direct keys 22 are printed in the corresponding indentations 39.

On the operation panel 12 shown in FIG. 2, cursor keys 23 and a setting key 24, which are examples of a first operator, are also provided. The cursor keys 23 include a cursor key (up) 23_1, a cursor key (down) 23_2, a cursor key (left) 23_3, and a cursor key (right) 23_4. The cursor keys 23 are press buttons for moving a cursor on the LCD display screen 121 to the top, bottom, right, and left sides. The setting key 24 is a press button for setting the content selected by the cursor on the LCD display screen 121. The cursor keys 23 of this exemplary embodiment have a function of selecting a function item and a function value and a function of setting a selected function item and a selected function value.

On the operation panel 12 shown in FIG. 2, a user setting key 25, a return key 26, etc. are disposed around the cursor keys 23.

On the operation panel 12 shown in FIG. 2, a numeric keypad 27, a clear key 28, a reset key 29, and a start key 30 are disposed.

The numeric keypad 27 is set of press buttons for inputting a fax number of a fax sender, the number of copies, etc. The clear key 28 is used as a press button for resetting the content input by using the numeric keypad 27. The reset key 29 is a press button for resetting the multifunction device 10 to the initial state. The start key 30 is a press button for starting an operation corresponding to a mode currently specified by one of the mode switch keys 21. As stated above, the multifunction device 10 has a copy mode, a scan mode, and a fax mode. In any of these modes, the reading of an image of a document by the image reading unit 11 (see FIG. 1) is performed. Accordingly, when the start key 30 is pressed, the reading of an image of a document by using the image reading unit 11 is started.

On the operation panel 12 shown in FIG. 2, plural keys as well as the above-described keys are disposed. However, they are not necessary for the following description and an explanation thereof will thus be omitted.

Figure 3:
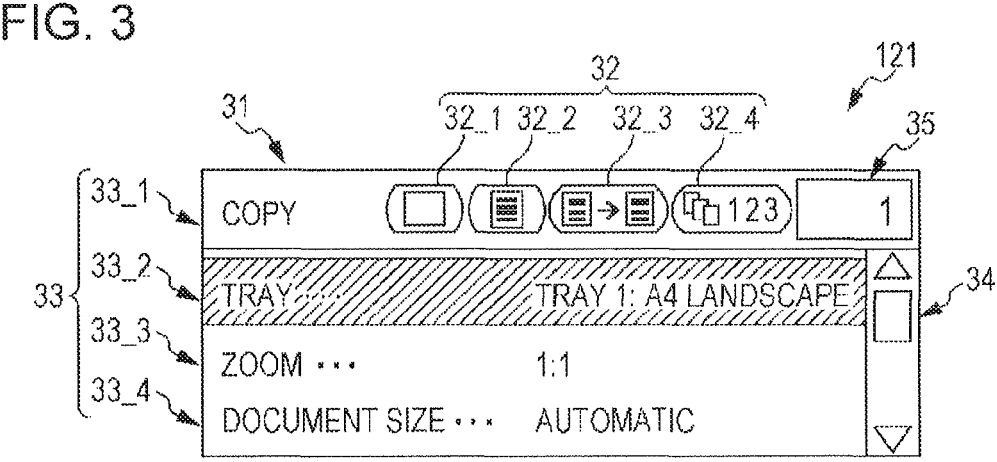
FIG. 3 shows a basic screen to be displayed when the multifunction device is powered ON or a reset key is pressed.

FIG. 3 shows a basic screen to be displayed when the multifunction device 10 is powered ON or the reset key 29 is pressed. A menu indicated on the basic screen corresponds to a first menu in an exemplary embodiment of the invention, and an each item arranged in the menu corresponds to an example of a function item in an exemplary embodiment of the invention.

The LCD display screen 121 is a display section constituted by four lines 33 including a first line 33_1 through a fourth line 33_4. In the first line 33_1, a title 31, icons 32, and the number of copies 35 are indicated.

In the column of the title 31, the title of this screen is displayed. In the multifunction device 10, the copy mode is selected in the initial state. Accordingly, as the title 31, "COPY" indicating the copy mode is displayed.

In the column of the icons 32, four icons 32_1 through 32_4 associated with the four direct keys 22 shown in FIG. 2 are displayed.

The icon 32_1 corresponds to the direct key (density) 22_1, and as the icon 32_1, an icon representing a stylized function value of the function item "density" is displayed. The icon 32_1 shown in FIG. 3 indicates that the currently set copy density as the initial function value is "normal". The copy density can be selected from among plural function values, such as "normal", "slightly dark", and "dark" (see FIGS. 5 and 6). If, instead of the currently selected function value "normal", another function value "slightly dark" or "dark" is selected, the icon 32_1 is changed to an icon associated with the selected function value. FIG. 6 shows an icon associated with "slightly dark" as the icon 32_1.

The icon 32_2 corresponds to the direct key (document type) 22_2, and an icon representing a stylized function value of the function item "document type" is indicated as the icon 32_2. The icon 32_2 shown in FIG. 3 indicates that the currently set document type as the initial function value is "text". The document type can be selected from among plural function values, such as "text", "photo", and "text and photo". If, instead of the currently selected function value "text", another function value "photo" or "text and photo" is selected, the icon 32_2 is changed to an icon associated with the selected function value.

The function values "text", "photo", and "text and photo" are function values for adjusting a document-image reading method employed in the image reading unit 11 to reading methods suitable for text, photo, and text and photo, respectively.

The icon 32_3 corresponds to the direct key (duplex) 22_3, and an icon representing a stylized function value of the function item "duplex" is indicated as the icon 32_3. The function item "duplex" means that it is possible to determine whether it is necessary to copy only one side or both sides of a document and it is possible to select whether printing is performed on only one side or both sides of a sheet.

Figure 8:
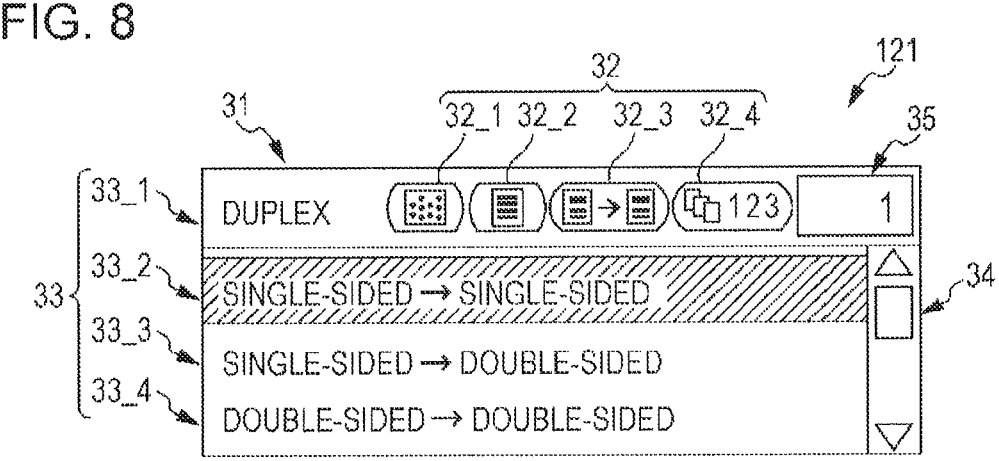
FIG. 8 shows a function list screen corresponding to a function item "duplex" displayed when a direct key (duplex) is pressed.

Concerning the function item "duplex", a function value can be selected from among four function values "single-sided→single-sided", "single-sided→double-sided", "double-sided→double-sided", and "double-sided→single-sided", as shown in FIG. 8. Due to the limitations of the number of lines that can be displayed on the LCD display screen 121, "double-sided→single-sided" is not shown in FIG. 8.

The function value "single-sided→single-sided" means that an image recorded on a single side of a document is copied on a single side of a sheet. The function value "single-sided→double-sided" means that images recorded on single sides of plural documents are copied, by forming two documents as a pair, on double sides of a sheet. The function value "double-sided→double-sided" means that images recorded on double sides of a document are copied on double sides of a sheet. The function value "double-sided→single-sided" means that images recorded on double sides of a document are copied on single sides of two sheets.

The icon 32_3 shown in FIG. 3 indicates that the function value "single-sided→single-sided" is set as the function item "duplex". If, instead of the function value "single-sided→single-sided", another function value "single-sided→double-sided", "double-sided→double-sided", or "double-sided→single-sided" is selected, the icon 32_3 is changed to an icon associated with the selected function value.

The icon 32_4 shown in FIG. 3 corresponds to the direct key (sort/resolution) 22_4.

Figure 9:
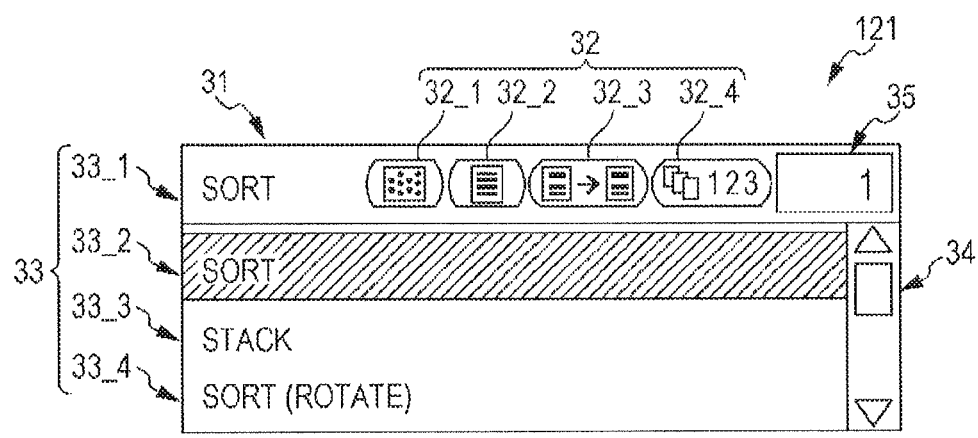
FIG. 9 shows a function list screen corresponding to a function item "sort" displayed when a direct key (sort/resolution) is pressed.

The direct key (sort/resolution) 22_4 corresponds to a function item "sort" in the copy mode, and the icon 32_4 is an icon representing a stylized function value of the function item "sort". Concerning the function item "sort", a function value can be selected from among three function values "sort", "stack", and "sort (rotate)", as shown in FIG. 9.

For example, a case in which five sets of a document having three pages are copied will be considered. The function value "sort" is a mode in which images are formed in order of the first page→the second page→the third page such that the three pages of the document forms one set and five sets (three pages×five sets=a total of 15 sheets) of the document are formed. The function value "stack" is a mode in which images are formed in order of the first page×five sheets→the second page×five sheets→the third page×five sheets. The function value "sort (rotate)" is a mode in which the image forming order is the same as that in "sort", but the orientation of sheets is changed alternately set by set, such as the first set of three sheets (first page→second page→third page) is output, for example, in portrait orientation, and the second set of three sheets is output in landscape orientation by rotating the orientation of the first set of sheets by 90°, and the third set of three sheets is output in portrait orientation again. In order to implement this function "sort (rotate)", the image forming unit 14 of the multifunction device 10 of this exemplary embodiment shown in FIG. 1 has a function of rotating the orientation of sheets.

The icon 32_4 shown in FIG. 3 indicates that the function value "sort" is set as the function item "sort". If another function value "stack" or "sort (rotate)" is set instead of "sort", the icon 32_4 is also changed to an icon associated with "stack" or "sort (rotate)".

The number of copies 35 displayed at the right corner of the first line 33_1 shown in FIG. 3 indicates the number of copies to be produced. In FIG. 3, the number "1" is indicated as the initial value. The number of copies can be changed by operating the numeric keypad 27 (see FIG. 2), and when the number of copies is changed, a new number is indicated in the column of the number of copies 35.

In the second line 33_2 through the fourth line 33_4 of the four lines 33 shown in FIG. 3, function items other than the function items assigned to the four direct keys 22 (see FIG. 2) are displayed.

Every time the cursor key (down) 23_2 is pressed, the cursor (the hatched portion shown in FIG. 3) on the basic screen shown in FIG. 3 moves down line by line. If the cursor key (down) 23_2 continues to be pressed, function items, for example, "N-up (the number of pages per sheet)" and "border erase", other than the three function items "tray", "zoom", and "document size", appear on this screen. A detailed explanation of function items which are not shown in FIG. 3 will be omitted. The function items assigned to the direct keys 22 do not appear on this basic screen in whatever manner the cursor keys 23 are operated.

In FIG. 3, the cursor (the hatched portion shown in FIG. 3) on the basic screen is placed in the second line 33_2 in which the function item "tray" is indicated. As stated above, when the cursor key (down) 23_2 shown in FIG. 2 is pressed, the cursor on the screen moves to the third line 33_3, and when the cursor key (down) 23_2 is pressed again, the cursor moves to the fourth line 33_4. When the cursor key (down) 23_2 is pressed again, the display in the second line 33_2 through the fourth line 33_4 is scrolled upward by one line while the cursor is remaining in the third line 33_3, and a new function item (for example, "N-up") is displayed in the fourth line 33_4. Then, when the cursor key (up) 23_1 is pressed, the cursor on the screen moves from the fourth line 33_4 to the third line 33_3, and when the cursor key (up) 23_1 is pressed again, the cursor moves from the third line 33_3 to the second line 33_2. When the cursor key (up) 23_1 is pressed again, the display in the second line 33_2 through the fourth line 33_4 is scrolled downward by one line while the cursor is remaining in the second line 33_2.

By adjusting the cursor to a desired function item in this manner, the function item is selected, and the setting key 24 shown in FIG. 2 is pressed. Then, the function item selected by the cursor is set, and the basic screen moves to a function list screen corresponding to the set function item.

Figure 4:
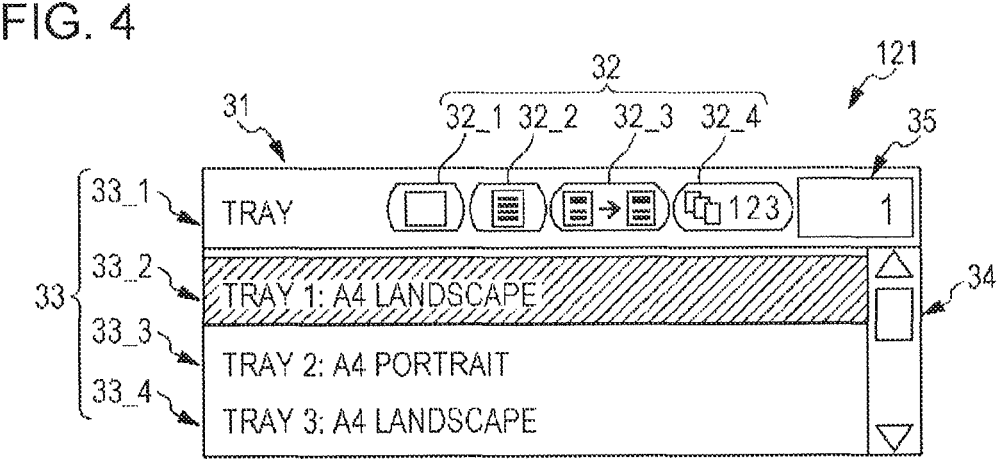
FIG. 4 shows a function list screen corresponding to a function item "tray"

FIG. 4 shows a function list screen corresponding to the function item "tray".

On the basic screen shown in FIG. 3, when the setting key 24 is pressed while the cursor is being adjusted to the function item "tray", as shown in FIG. 3, the function list screen shown in FIG. 4 is displayed on the LCD display screen 121 instead of the basic screen shown in FIG. 3.

As the title 31 of the first line 33_1 of this function list screen, "tray" indicating that this function list screen is a function list screen corresponding to the function item "tray" is shown.

Although it is not shown in FIG. 1, the image forming unit 14 includes three trays (tray 1 through tray 3) in which blank sheets are stored. In the tray 1 through the tray 3, A4 size sheets in landscape orientation, A4 size sheets in portrait orientation, and A4 size sheets in landscape orientation are respectively stored.

On the function list screen shown in FIG. 4, by adjusting the cursor to one of the three function values "tray 1", "tray 2", and "tray 3", the function value is selected, and then, when the setting key 24 is pressed, the function value is set. That is, thereafter, sheets are fed from the selected tray, and images are formed on the sheets in the image forming unit 14.

Concerning the function items assigned to the direct keys 22, by pressing any of the direct keys 22, the screen is moved to the associated function list screen without the need for a user to operate the cursor keys 23.

Figure 5:
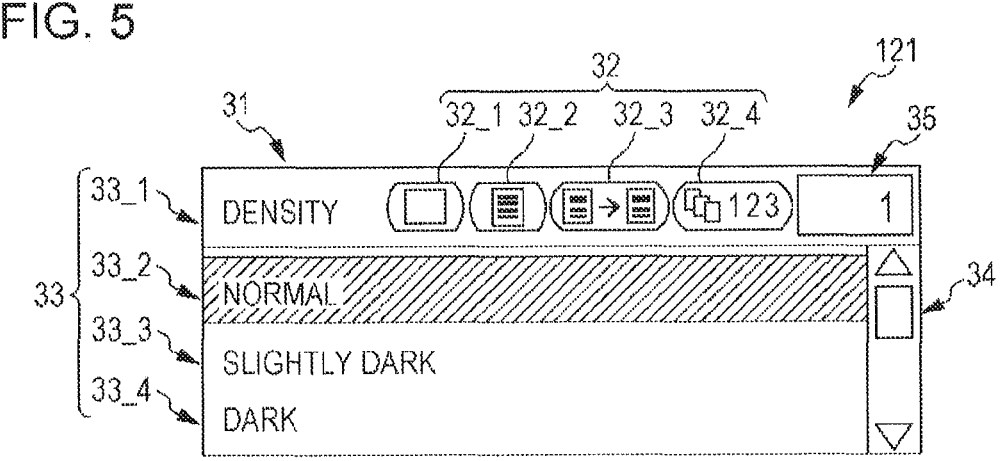
FIG. 5 shows a function list screen corresponding to a function item "density"
Figure 6:
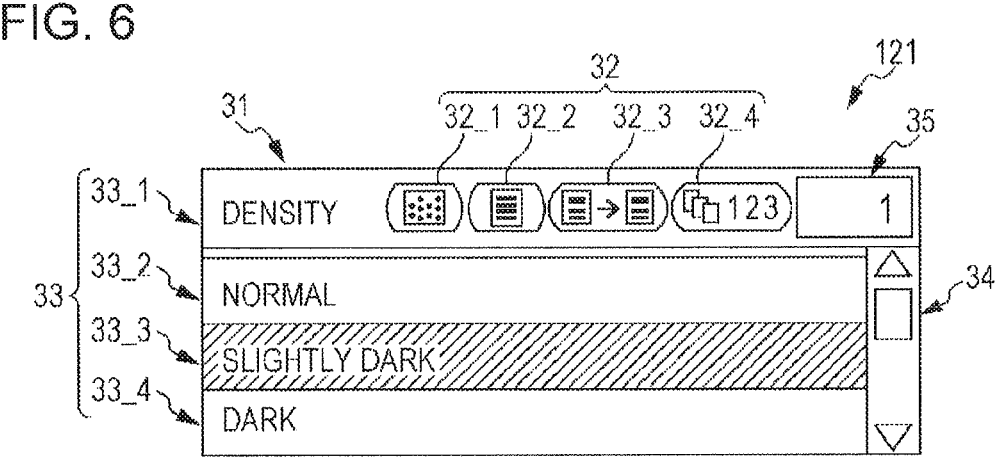
FIG. 6 shows a function list screen corresponding to the function item "density" after moving an icon to a function value "slightly dark"

FIG. 5 shows a function list screen corresponding to the function item "density".

When, among the four direct keys 22 shown in FIG. 2, the direct key (density) 22_1 is pressed, a function list screen associated with the function item "density" shown in FIG. 5 is displayed on the LCD display screen 121.

In FIG. 5, the cursor is superposed on the currently selected function value "normal" as the initial value.

For moving this cursor, the direct key (density) 22_1 is pressed again without the need for a user to move a finger pressing the direct key (density) 22_1 to another key, and then, the cursor on the function list screen shown in FIG. 5 moves from the function value "normal" to a function value "slightly dark".

FIG. 6 shows a function list screen associated with the function item "density" after the cursor has moved to the function value "slightly dark".

As shown in FIG. 6, if the cursor is moved to the function value "slightly dark", the icon 32_1 corresponding to the direct key (density) 22_1 is also changed to an icon indicating the function value "slightly dark".

When the direct key (density) 22_1 is pressed again, the cursor moves to the function value "dark", and when the direct key (density) 22_1 is pressed once again, function values "pale" and "slightly pale", which are not shown in FIG. 5 or 6, are sequentially selected. Thereafter, the cursor returns to the initial position, and the function value "normal" is selected.

That is, by pressing the direct key (density) 22_1 many times, all the function values forming the function item "density" are sequentially and cyclically selected.

In this exemplary embodiment, in this manner, it is possible to select a desired function value of the function item "density" without the need for a user to move a finger from the direct key (density) 22_1 to another key. The function items assigned to the other direct keys 22 can be handled in a similar manner.

In order to set a function value selected by pressing the direct key 22 in this manner, there are plural methods which can be performed.

In one method, the setting key 24 is pressed in a manner similar to a case in which the above-described cursor keys 23 are used. Then, a selected function value is set, and the display returns to the basic screen shown in FIG. 3.

In another method, while the function value "slightly dark", for example, is being selected, as shown in FIG. 6, the start key 30 is pressed. Then, the function value "slightly dark" is set, and a copying operation is started. An image formed on a sheet by this copying operation is an image reflecting the function value "slightly dark".

In this exemplary embodiment, if a function value is selected by pressing a certain direct key, and if another direct key is pressed while the function value is being selected, the selected function value is set. For example, a description will be given of a case in which, by pressing the direct key (density) 22_1, the function value "slightly dark" is selected, as shown in FIG. 6, and then, the direct key (document type) 22_2 is pressed.

Figure 7:
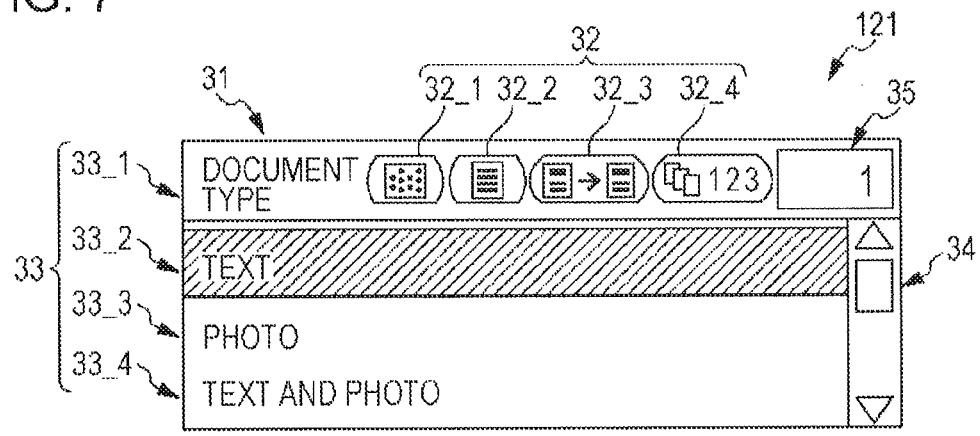
FIG. 7 shows a function list screen corresponding to a function item "document type"

FIG. 7 shows a function list screen associated with the function item "document type".

The function value "slightly dark" is selected, as shown in FIG. 6, and when the direct key (document type) 222 is pressed, the function value "slightly dark" is set. Then, on the LCD display screen 121, a function list screen associated with the function item "document type" is displayed.

The icon 32_1 on the function list screen shown in FIG. 7 indicates that the current function value of the function item "density" is "slightly dark".

In this exemplary embodiment, a selected function value may also be set after the lapse of a predetermined time set in a timer used for setting a function value (hereinafter simply referred to as the "timer (setting)"). Counting of time is started upon pressing a direct key 22. At the time point at which the predetermined time has elapsed without any operation performed on a direct key 22, a selected function value is set.

In this exemplary embodiment, this predetermined time is set to be two seconds, for example, at the time of shipping of the multifunction device 10 shown in FIG. 1. If a user finds this time (two seconds) too short, the user may change this time to three seconds, four seconds, or five seconds. The operation for changing the predetermined time will be discussed later.

In this example, the predetermined time is initially set to be the shortest time (two seconds). Accordingly, a user who finds this time (two seconds) appropriate is able to speedily set the function value.

In this exemplary embodiment, by performing any one of the above-described four setting methods (pressing of the setting key 24, pressing of the start key 30, pressing of another direct key 22, and the lapse of a predetermined time), a function value is set.

In this exemplary embodiment, another timer (resetting) is used. In this timer, the length of time, for example, two minutes, which is much longer than two to five seconds used in the above-described timer for setting function values, can be set on a minute-by-minute basis.

Counting of time in this timer is started when a key operation is finished or another operation, for example, a copying operation, is finished. After the lapse of the time in this timer (resetting), function values which have been changed by performing a key operation become invalid, and the settings return to the initial state.

Among the four direct keys 22, the remaining keys, that is, the direct key (duplex) 22_3 and the direct key (sort/resolution) 22_4, are handled in a similar manner.

FIG. 8 shows a function list screen associated with the function item "duplex" displayed when the direct key (duplex) 22_3 is pressed.

FIG. 9 shows a function list screen associated with the function item "sort/resolution" displayed when the direct key (sort/resolution) 22_4 is pressed. The direct key (sort/resolution) 22_4 corresponds to the function item "sort" in the copy mode, and corresponds to the function item "resolution" in the scan mode and the fax mode. The function item "sort/resolution" is discussed here by taking the copy mode by way of example. Accordingly, the function item "sort" in the copy mode is displayed in the column of the title 31 of the function list screen shown in FIG. 9.

Operations for selecting and setting a function value of the function item "sort" are similar to those of the function item "density" discussed with reference to FIGS. 5 and 6, and thus, an explanation thereof will be omitted here.

In the above-described description, "selecting" and "setting" of a function value have been discussed as two different actions, and the difference between the concept of "selecting" and that of "setting" will be described below.

FIGS. 10A, 10B, and 10C show a change in the content of the memory 132 as a function value is being selected and set.

FIG. 10A shows a default value storage area within the memory 132 (see FIG. 1). In the default value storage area shown in FIG. 10A, default values (initially set values) already written into the multifunction device 10 shown in FIG. 1 at the time of shipping of the multifunction device 10 or default values which are preset by considering the ease of operation for a user are stored semi-permanently.

FIG. 10B shows a reference area within the memory 132 which is referred to when an actual copying operation is performed. In the reference area, currently valid (set) function values are recorded. (B1) through (B4) of FIG. 10B, which are vertically shown in FIG. 10B, show a change in the content of the reference area over time.

FIG. 10C shows a temporary work area within the memory 132. In the temporary work area, a function value specified by the position of a cursor on a function list screen is recorded. (C1) through (C3) of FIG. 10C, which are vertically shown in FIG. 10C, show a change in the content of the temporary work area over time.

The difference between the concept of "selecting" and that of "setting" will be discussed below by focusing function values of the function item "density". In the default value storage area shown in FIG. 10A, "normal" is recorded as the function value of the function item "density".

When the multifunction device 10 is powered ON, the default values stored in the default value storage area shown in FIG. 10A are copied onto the reference area shown in FIG. 10B (copy 1), as indicated by (B1) of FIG. 10B.

When performing a copying operation, the multifunction device 10 refers to the function values written into the reference area shown in FIG. 10B. Accordingly, when the multifunction device 10 is powered ON and starts a copying operation without changing the function values, the copying operation is performed in accordance with the content shown in (B1) of FIG. 10B.

It is now assumed that, at this time, a function value will be changed. In this example, a case in which the function value of the function item "density" will be changed from "normal" to "slightly dark" will be discussed.

Upon starting an operation for changing the function value, the content of (B1) of FIG. 10B is copied onto the temporary work area shown in FIG. 10C (copy 2), thereby creating the temporary work area shown in (C1) of FIG. 10C. When "slightly dark" is selected as the function value of the function item "density" by performing a key operation, "slightly dark" is recorded in the column of the function value of the density in the temporary work area, as shown in (C2) of FIG. 10C. This is performed by changing the position of the cursor on the function list screen, as stated above. At this time point, as indicated by (B2) of FIG. 10B, the reference area (FIG. 10B) referred to when performing a copying operation by the multifunction device 10 is maintained at the same content as that indicated by (B1) of FIG. 10B.

When one of the above-described four setting methods is performed, for example, when several seconds have elapsed, the content of the temporary work area ((C3) of FIG. 10C) is copied onto the reference area (FIG. 10B) (copy 3). As a result, the selected function value ("slightly dark") is set, as indicated by (B3) of FIG. 10B. Thereafter, the multifunction device 10 performs a copying operation in accordance with the set function value ((B3) of FIG. 10B).

When the reset key 29 (see FIG. 2) is pressed or when a predetermined time for about several minutes which is set in the resetting timer has elapsed after the end of a certain operation, the default values stored in the default value storage area shown in FIG. 10A are copied onto the reference area shown in FIG. 10B (copy 4), and the content of the reference area returns to the initial state, as indicated by (B4) of FIG. 10B (the same content as that of (B1) of FIG. 10B).

The concept of "selecting" and that of "setting" have been discussed through illustration of the above-described example.

Then, a description will be given of the assignment of function items to the direct keys 22 through the illustration of the copy mode by way of example.

Figure 11:
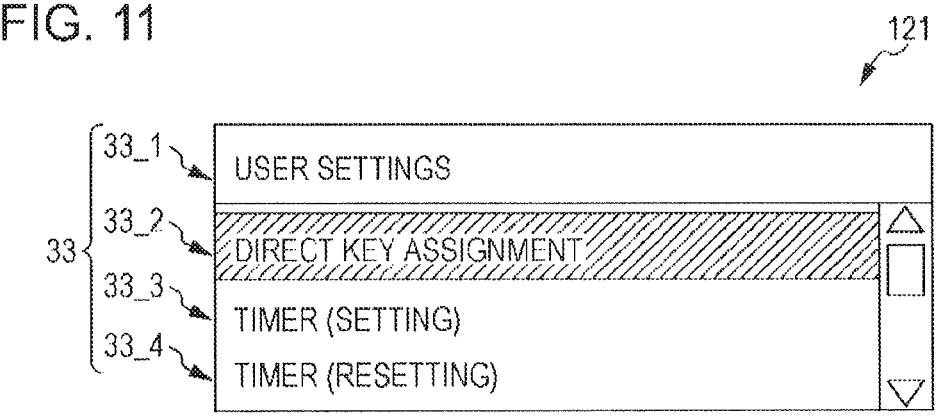
FIG. 11 shows a user setting screen.

FIG. 11 shows a user setting screen.

In the state in which the basic screen for the copy mode is displayed on the LCD display screen 121, the user setting key 25 on the operation panel 12 shown in FIG. 2 is pressed. Then, a user setting screen shown in FIG. 11 is displayed on the LCD display screen 121. In the first line 33_1 on the user setting screen, "user settings" indicating that this screen is a user setting screen is displayed, and various user setting items are displayed in the second through fourth lines. As the user setting items, "direct key assignment" is displayed in the second line 33_2, "timer (setting)" is displayed in the third line 33_3, and "timer (resetting)" is displayed in the fourth line 33_4.

In order to change the function item assigned to a direct key 22, the cursor is adjusted to "direct key assignment", and then, the setting key 24 is pressed. Then, a direct key assignment screen is displayed on the LCD display screen 121. This operation for assigning a direct key is started from the state in which the basic screen for the copy mode shown in FIG. 3 is displayed on the LCD display screen 121, and thus, the direct key assignment screen is a screen for assigning a function item concerning the copy mode to a direct key 22.

Figure 12:
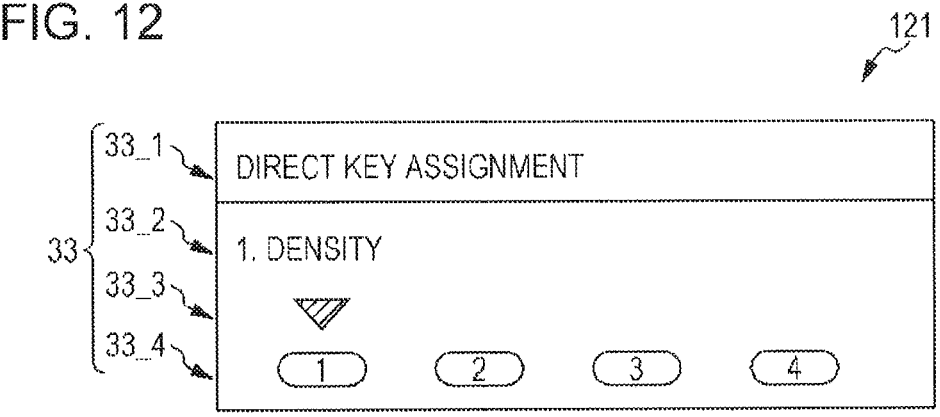
FIG. 12 shows a direct key assignment screen.

FIG. 12 shows a direct key assignment screen concerning the copy mode.

In the first line 33_1, "direct key assignment" indicating that this screen is a direct key assignment screen is displayed.

In the fourth line 33_4, four button marks associated with the four direct keys 22_1 through 22_4 (see FIG. 2), respectively, are displayed.

In the third line 33_3, an inverted triangle cursor pointing one of the four button marks is shown. In FIG. 12, the inverted triangle cursor points the button mark with a numeric character "1". In the second line 33_2, the number representing the direct key associated with the button mark pointed by the inverted triangle cursor and a function item assigned to this direct key are displayed. In FIG. 12, "1: density", which is a combination of the number "1" representing the direct key (density) 22_1 and "density" indicating the function item "density" currently assigned to the direct key (density) 22_1, is displayed.

By operating the cursor key (left) 23_3 and the cursor key (right) 23_4 shown in FIG. 2, the button mark can be reselected. If the inverted triangle cursor is adjusted to, for example, the button mark with a numeric character "2", "2: document type" is displayed in the second line 33_2. The other button marks can be handled in a similar manner.

It is now assumed that a function item other than "density" will be assigned to the direct key (density) 22_1. As shown in FIG. 12, the inverted triangle cursor is adjusted to the button mark with the numeric character "1", and then, the setting key 24 is pressed. Then, a screen for assigning a function item to the direct key (density) 22_1 is displayed.

Figure 13:
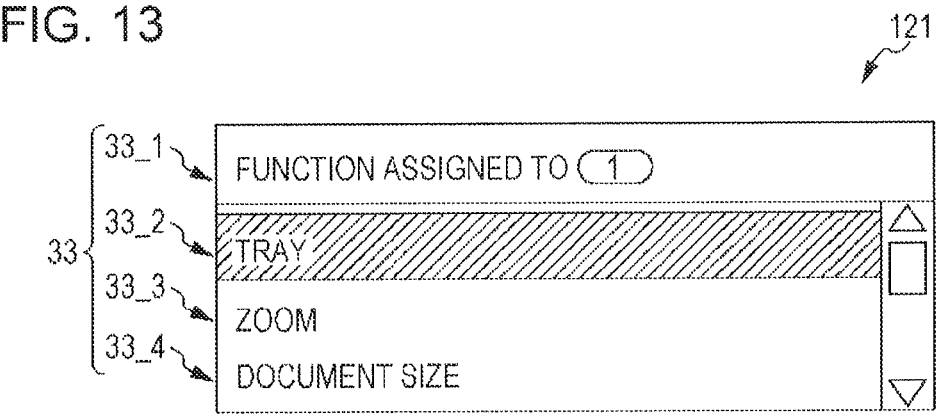
FIG. 13 shows a screen for assigning a function item to a direct key (density)

FIG. 13 shows a screen for assigning a function item to the direct key (density) 22_1.

In the first line 33_1, the title of this screen is displayed. In the second line 33_2 through the fourth line 33_4, function items which can be assigned to the direct key (density) 22_1 are disposed. In this case, a function item which has already been assigned to any of the direct keys 22 is deleted from a list of function items which can be assigned to the direct key (density) 22_1. The reason for this is to prevent the same function item from being assigned to two different direct keys 22.

As shown in FIG. 13, "tray" is selected as an example of a new function item to be assigned to the direct key (density) 22_1, and by pressing the setting key 24, the assignment of the function item "tray" is set.

After setting the assignment of the function item "tray" by pressing the setting key 24, the display of the LCD display screen 121 returns to the direct key assignment screen shown in FIG. 12. In this case, in the second line 33_2 of the direct key assignment screen, "1: tray" is displayed.

When the return key 26 is pressed while the direct key assignment screen shown in FIG. 12 is being displayed, the display returns to the user setting screen shown in FIG. 11, and when the return key 26 is pressed once again, the display returns to the basic screen.

FIG. 14 shows the basic screen which is redisplayed after the function item assigned to the direct key (density) 22_1 has been changed.

On the basic screen shown in FIG. 14, the function item "density", which is not displayed on the basic screen shown in FIG. 3, has appeared.

On the other hand, the function item "tray", which is displayed on the basic screen shown in FIG. 3, has disappeared from the basic screen shown in FIG. 14. The function item "tray" will not appear even by scrolling the display. This is because the function item "tray" has replaced the function item "density" and assigned to the direct key (density) 22_1. Function items assigned to direct keys are deleted from a list of function items which can be selected on the basic screen, thereby enabling a user to view the basic screen and to select function items more easily.

In the first line 33_1 on the basic screen shown in FIG. 14, an icon with a numeric character "1" representing the tray "1" is displayed as the icon 32_1 associated with the direct key (density) 22_1. In this manner, four icons 32_1 through 32_4 arranged in the first line 33_1 correspond to function items assigned to the four direct keys 22_1 through 22_4, respectively. In this manner, when the assignment of a function item to any of the direct keys 22_1 through 22_4 is changed, an icon corresponding to a direct key to which a new function item is assigned is also changed to a new icon indicating a currently set function value of the new function item.

FIGS. 15 and 16 show assignment tables for assigning function items to the direct keys. These tables are stored in the memory 132 shown in FIG. 1. FIG. 15 shows an assignment table before the assignment of a function item to a direct key has been changed as described above. FIG. 16 shows an assignment table after the assignment of a function item to a direct key has been changed as described above.

As shown in FIG. 15, before the assignment of a function item has been changed as described above, the function item "density" has been assigned to the direct key (density) 22_1 as the function item in the copy mode. However, by changing the function item to be assigned, the function item "tray" is assigned to the direct key (density) 22_1, as shown in FIG. 16.

This example shows that, in this exemplary embodiment, a function item can be assigned to a direct key 22 such that the function item to be assigned can be changed. Although a description has been given of the reassignment of a function item concerning the copy mode, the reassignment of function items to the direct keys concerning the scan mode and the fax mode may be performed in a similar manner.

After the function item "tray" has replaced the function item "density" and has been newly assigned to the direct key (density) 22_1, the name of the direct key (density) 22_1 should also be changed to a "direct key (tray) 22_1". However, for avoiding the complexity of description, the direct key 22_1 is coherently called "direct key (density) 22_1". On the operation panel 12 shown in FIG. 2, the name of the function item, "density", is printed in the indentation 39 above the direct key (density) 22_1. When the assignment of a function item to the direct key (density) 22_1 is changed, an adhesive label indicating, for example, the name of a new function item, is overlaid on the printing of "density".

Figure 17:
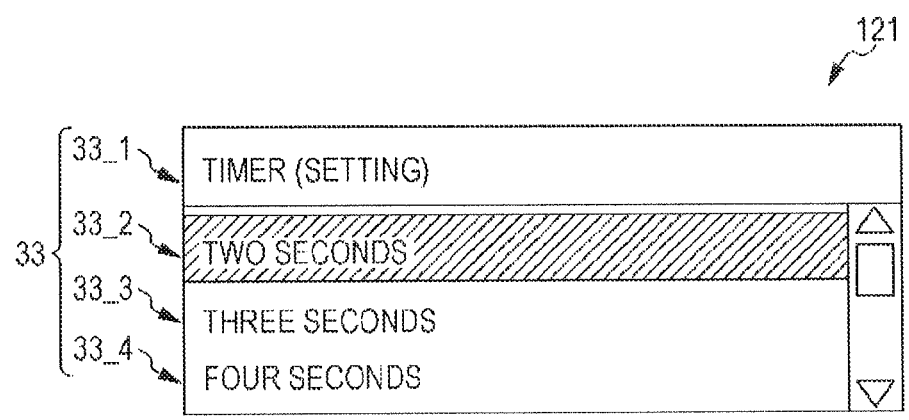
FIG. 17 shows a time selecting screen for setting a time in a timer (setting)

FIG. 17 shows a time selecting screen for setting a time in the timer (setting).

The timer (setting) indicates a time to be taken to set a function value after the function value has been selected by pressing a direct key 22 and no operation has been performed on any of the keys. After the lapse of a time set in this timer (setting), a selected function value is set even if no operation is performed on any of the keys, and the display shifts to the basic screen.

If the user setting screen shown in FIG. 11 is displayed by pressing the user setting key 25 and if the cursor is adjusted to the "timer (setting)" on the user setting screen and the setting key 24 is pressed, the time selecting screen for setting a time in the timer (setting) shown in FIG. 17 is displayed on the LCD display screen 121.

In the first line 33_1 of the time selecting screen shown in FIG. 17, the title of this screen "timer (setting)" is displayed. In the second line 33_2 through the fourth line 33_4, times which can be selected, two seconds, three seconds, and four seconds, are displayed. As this timer (setting), five seconds may be selected. However, due to the limitations of the number of lines that can be displayed on the LCD display screen 121, "five seconds" is not shown in FIG. 17. By moving the cursor, "five seconds" can be displayed. By adjusting the cursor to a desired time (seconds), the setting key 24 is pressed, and then, the time (seconds) is set. At the time of shipping of the multifunction device 10, the shortest time (two seconds) is set so that the function value can be speedily set. However, certain users may prefer slow operations and wish to have a little longer time, and thus, the time (seconds) to be taken to set a selected function value can be selected, as stated above.

When the setting key 24 is pressed while the time setting screen shown in FIG. 17 is being displayed, a selected time (seconds) is set, and the display returns to the user setting screen shown in FIG. 11. When the return key 26 is pressed while the user setting screen shown in FIG. 11 is being displayed, the display returns to the basic screen shown in FIG. 3 or 14.

On the user setting screen shown in FIG. 11, "timer (resetting)" is also displayed. The method for setting a time in the timer (resetting) is the same as that of the timer (setting), except that the length of time is longer than that of the timer (setting), for example, several minutes. Thus, an explanation and illustration of this timer (resetting) will be omitted.

Figure 18:
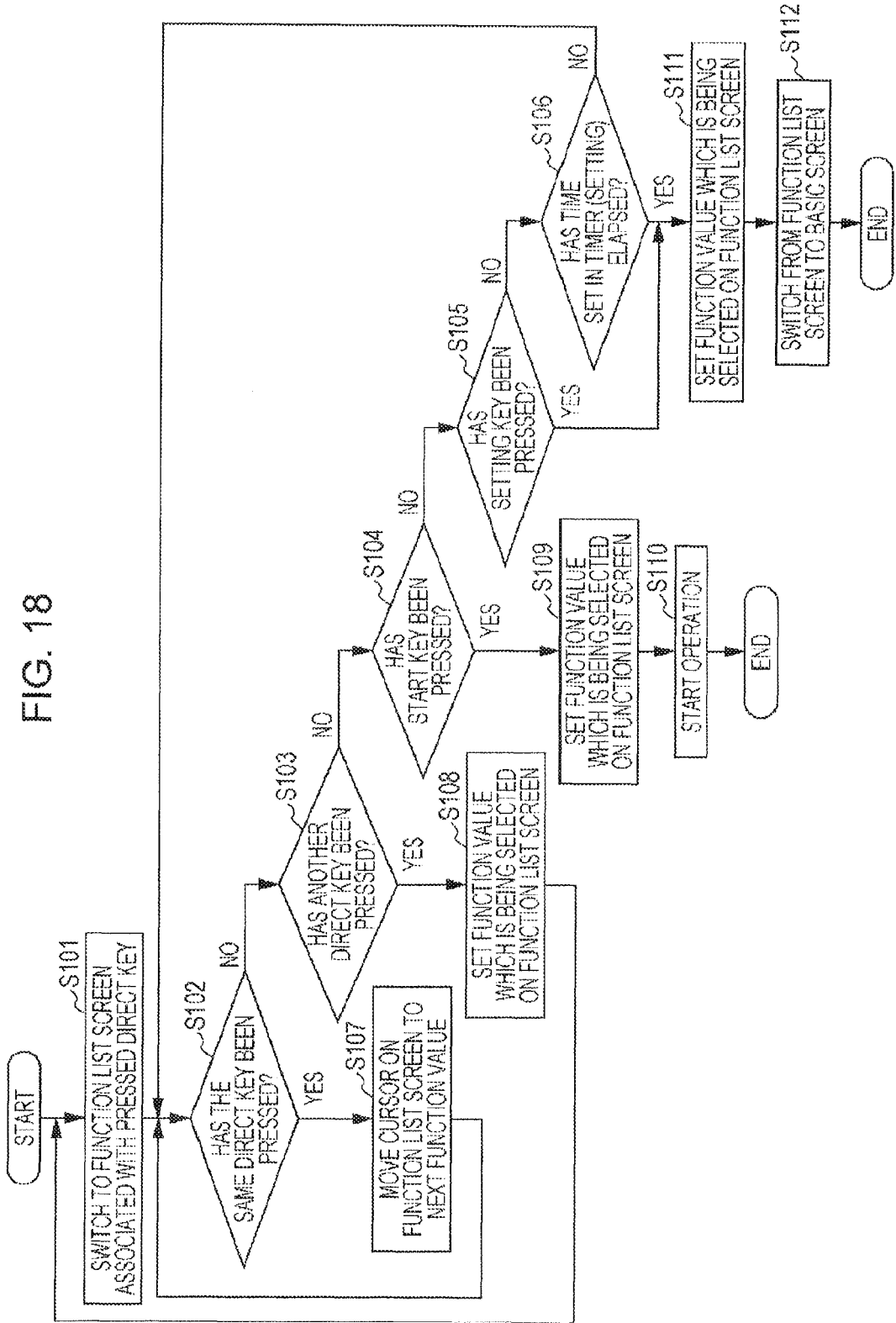
FIG. 18 is a flowchart illustrating processing for setting a function value by using a direct key, which is a characteristic of this exemplary embodiment.

FIG. 18 is a flowchart illustrating processing for setting a function value by using a direct key, which is a characteristic of this exemplary embodiment.

The function value setting processing shown in FIG. 18 is started when any one of the four direct keys 22 shown in FIG. 2 is pressed. A description will be given below, assuming that the direct key (density) 22_1 has been pressed, and also that the function item "density" has been assigned to the direct key (density) 22_1 before the reassignment of a function item, which has been discussed with reference to FIGS. 11 through 13, is performed.

When a direct key is pressed, the processing is started, and, in step S101, the display of the LCD display screen 121 is switched to a function list screen associated with the pressed direct key. In this processing, since it is assumed that the direct key (density) 22_1 is pressed, the function list screen associated with the function item "density" shown in FIG. 5 is displayed on the LCD display screen 121.

It is then determined in step S102 whether the same direct key as that pressed to start this processing, that is, the direct key (density) 22_1, has been pressed again. If the result of step S102 is NO, it is determined in step S103 whether another direct key has been pressed. If the result of step S103 is NO, it is determined in step S104 whether the start key 30 has been pressed. If the result of step S104 is NO, it is determined in step S105 whether the setting key 24 has been pressed. If the result of step S105 is NO, it is determined in step S106 whether a predetermined time which has been set in the timer (setting) has elapsed.

If it is determined in step S102 that the same direct key (direct key (density) 22_1) has been pressed, the process proceeds to step S107 in which the cursor on the function list screen moves to the next function value. For example, the cursor which is selecting the function value "normal" in FIG. 5 moves to the next function value "slightly dark", as shown in FIG. 6.

If the same direct key continues to be pressed, the cursor moves so that the next function values are sequentially selected, and when the cursor has moved to the final function value in the list, it returns to the first function value in the list. In this manner, the function values are cyclically selected.

In this case, the cursor on the function list screen is moved by pressing the same direct key. Alternatively, the cursor on the function list screen may be moved by pressing the cursor keys 23.

If it is determined in step S103 that another direct key 22 (for example, the direct key (document type) 22_2) has been pressed, the process proceeds to step S108 in which a function value which is being selected in the function list screen is set. Then, the process returns to step S101 in which the display of the LCD display screen 121 is switched to the function list screen (see FIG. 7) associated with the direct key (for example, the direct key (document type) 22_2) pressed in step S103.

If it is determined in step S104 that the start key 30 has been pressed, the process proceeds to step S109 in which a function value which is being selected on the function list screen is set. Then, in step S110, an operation is started in accordance with a current mode (for example, a copy mode).

If it is determined in step S105 that the setting key 24 has been pressed or if it is determined in step S106 that a predetermined time which has been set in the timer (setting) has elapsed, the process proceeds to step S111 in which a function value which is being selected on the function list screen is set. Then, in step S112, the display of the LCD display screen 121 is switched from the function list screen to the basic screen (see FIG. 3 or 14).

Figure 19:
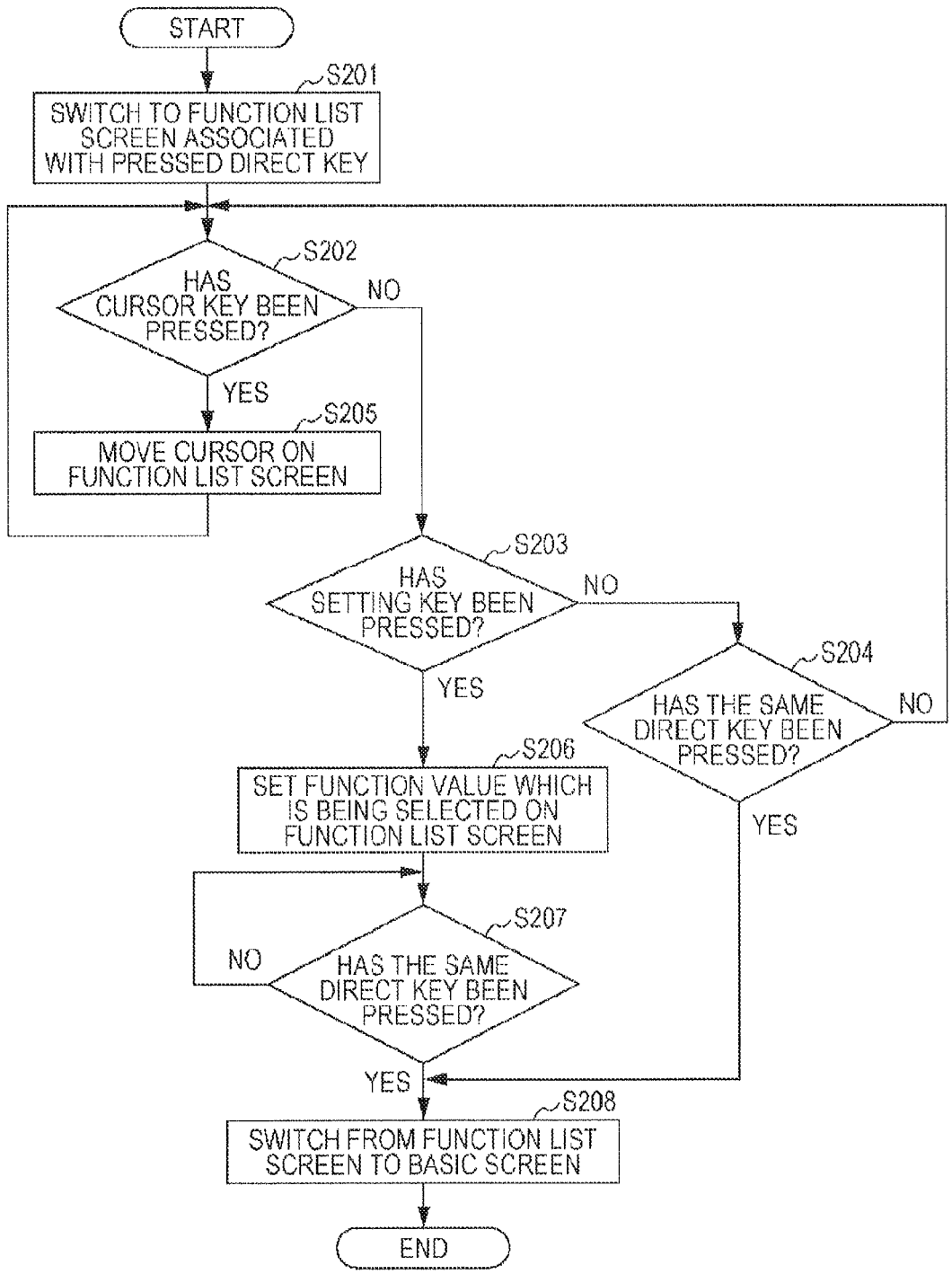
FIG. 19 is a flowchart illustrating processing for setting a function value by using a direct key executed in a comparative example.

FIG. 19 is a flowchart illustrating processing for setting a function value by using a direct key executed in a second comparative example, which will be discussed later. In the function value setting processing shown in FIG. 19, a function value which is being selected can be set, basically only by the setting key 24, and it is not possible to set a selected function value by using, for example, a timer. Additionally, unless a currently used function list screen is closed by pressing the same direct key, it is not possible to display a function list screen associated with another function item.

In this processing, too, a description will also be given, assuming that the direct key (density) 22_1 has been pressed.

When a direct key is pressed, in step S201, the display of the LCD display screen 121 is switched from the basic screen to a function list screen associated with the function item assigned to the pressed direct key. In this processing, since it is assumed that the direct key (density) 22_1 is pressed, the function list screen associated with the function item "density" shown in FIG. 5 is displayed on the LCD display screen 121.

It is then determined in step S202 whether a cursor key 23 has been pressed. If the result of step S202 is NO, it is determined in step S203 whether the setting key 24 has been pressed. If the result of step S203 is NO, it is determined in step S204 whether the same direct key as that pressed to start this processing has been pressed. In step S204, if a direct key different from the direct key pressed to start this processing is pressed, this pressing operation is ignored.

If it is determined in step S202 that a cursor key 23 has been pressed, the process proceeds to step S205 in which the cursor on the function list screen moves in a direction corresponding to the pressed cursor key 23. For example, if the cursor key (down) 23_2 is pressed while the function list screen concerning "density" shown in FIG. 5 is being displayed, the cursor which is selecting "normal" moves to "slightly dark", as shown in FIG. 6.

If it is determined in step S203 that the setting key 24 has been pressed, the process proceeds to step S206 in which a function value which is being selected on the function list screen is set. However, the content displayed on the LCD display screen 121 remains as the function list screen displayed in step S201. Thereafter, if it is determined in step S207 that the same direct key as that pressed to start this processing is pressed, the process proceeds to step S208 in which the display of the LCD display screen 121 is switched from the function list screen to the basic screen.

If the same direct key as that pressed to start this processing has been pressed in step S204 without pressing the setting key 24, the process proceeds to step S208. In this case, in step S208, a function value which is being selected by the cursor on the function list screen is not set, and instead, the display of the LCD display screen 121 is switched from the function list screen to the basic screen. As a result, the previously set function value is still valid.

In this manner, in the function value setting processing shown in FIG. 19, a selected function value can be set, basically only by the setting key 24, and it is not possible to set a selected function value by using, for example, a timer. Additionally, unless a function list screen which is currently used is closed by pressing the same direct key, it is not possible to display a function list screen associated with another function item.

FIG. 20 is a table indicating the number of operation steps necessary to change a function value according to this exemplary embodiment in comparison with a first comparative example and the above-described second comparative example. A description will be given of a case in which the function value of the function item "density" will be changed from "normal" to "slightly dark".

In a case (A) of the first comparative example, the function item "density" is not assigned to any direct key 22, as shown in FIG. 14, and the function item "density" is displayed only on the basic screen. An example in which the function item "density" is disposed on the fourth line 33_4, as shown in FIG. 14, will be discussed.

In this case, in the state in which the basic screen shown in FIG. 14 is being displayed, the cursor key (down) 23_2 is pressed twice so that the function item "density" can be selected. Then, by pressing the setting key 24, the function list screen concerning the density shown in FIG. 5 is displayed. Then, by pressing the cursor key (down) 23_2 once, the function value "slightly dark" is selected, and by pressing the setting key 24, the function value "slightly dark" is set. Then, the display returns to the basic screen.

In the case (A) of the first comparative example, five operation steps are necessary to set the function value "slightly dark" and to return to the basic screen, and it is necessary for a user to move a finger from a certain key to another key three times.

In a case (B) of the second comparative example, the function value setting processing shown in FIG. 19 is utilized.

In this case, while the basic screen is being displayed, the direct key (density) 22_1 is pressed first. Then, the function list screen concerning the function item "density" shown in FIG. 5 is displayed. Then, by pressing the cursor key (down) 23_2, the function value "slightly dark" is selected, and by pressing the setting key 24, the selected function value "slightly dark" is set. Then, by pressing the direct key (density) 22_1 once again, the display returns to the basic screen.

In the case (B) of the second comparative example, four operation steps are necessary to set the function value "slightly dark" by starting from the basic screen and to return to the basic screen, and it is necessary for a user to move a finger from a certain key to another key three times.

In a case (C) of this exemplary embodiment, a function value is changed as follows.

First, the direct key (density) 22_1 is pressed. Then, the function list screen shown in FIG. 5 is displayed. Then, the direct key (density) 22_1 is pressed once again, and the function value "slightly dark" is selected, as shown in FIG. 6. Then, by pressing the setting key 24, the selected function value "slightly dark" is set, and at the same time, the display returns to the basic screen.

In this case, only three operation steps are necessary to set the function value "slightly dark" and to return to the basic screen. Additionally, it is sufficient that a user moves a finger from a certain key to another key only once.

As shown in this example, concerning function items assigned to the direct keys 22, it is possible to change a function value of a function item with a small number of operation steps and without the need for a user to move a finger many times. Accordingly, function items which are highly likely to change their settings are assigned to the direct keys 22 in advance, thereby improving the ease of operation.

In the case (C) of this exemplary embodiment, an example in which a selected function value is set by pressing the setting key 24 has been discussed. As stated above, however, in this exemplary embodiment, a selected function value may be set when a time set in the timer (setting) has elapsed, and the display may also return to the basic screen. Accordingly, if a selected function value is set after the lapse of a time set in the timer (setting), it is possible to set a desired function value merely by pressing the same direct key and even with a smaller number of operation steps than when a selected function value is set by pressing the setting key 24.

A description has been given of an example in which an exemplary embodiment of the present invention is applied to a multifunction device shown in FIG. 1 having a scan mode and a fax mode as well as a copy mode. However, an exemplary embodiment of the present invention may be applied to another device, such as a printer without the image reading unit 11, that is, without a scan mode or a fax mode, or to a copy dedicated machine without a scan mode or a fax mode even though the image reading unit 11 is provided.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A multifunction apparatus, comprising:
an image forming unit;
an operation panel comprising a display screen, a plurality of operation keys, and a cursor key;
a control processor configured to:
display on the display screen an image processing function list with different selectable values in response to pressing a first operation key of the operation keys a first time; and move between the selectable values to a value of the displayed function list in response to pressing said first operation key a second time without first pressing any other key on the operation panel; and setting a function value which is being highlighted on the image processing function list in response to pressing a second operation key other than the first operation key.

2. The multifunction apparatus of claim 1, wherein the control processor is further configured to set the selected value of the displayed function if a predetermined time elapses without pressing another of the plurality of operation keys.

3. The multifunction apparatus of claim 1, further comprising:

setting a function value which is being highlighted on the image processing function list and starting operation in response to a start key being pressed, wherein the start key is different from all of the operation keys.

4. The multifunction apparatus of claim 1, wherein the operation keys comprise press buttons used for setting function items or function values on the display screen displayed.

5. The multifunction apparatus of claim 1, further comprising:

setting a function value which is being highlighted on the image processing function list and starting operation in response to pressing a start key that is a key different from all of the operation keys.

6. The multifunction apparatus of claim 5, wherein the operation panel further comprises a setting key that sets a function value, said setting key being separate from the operation keys and the start key.

7. A multifunction apparatus, comprising:
an image forming unit;
an operation panel comprising:
  a display,
  a setting key for setting a function value which is being highlighted,
  a start key for starting operation,
  a plurality of operation keys are keys used for setting function values displayed, and
  a cursor key for moving between selectable values,
  wherein the start key, setting key, cursor key, and operation keys are all different keys,
a control processor configured to:
  display, on the display, a function-assigning screen comprising an image processing function list with different selectable values in response to pressing a first operation key of the operation keys a first time;
  move between the selectable values to highlight a value of the displayed function list in response to pressing said first operation key a second time without first pressing any other key on the operation panel;
  setting a function value which is being highlighted on the image processing function list in response to pressing a second operation key other than the first operation key; and
  setting a function value which is being highlighted on the image processing function list and starting operation in response to pressing the start key that is different from all of the operation keys and the setting key; and
  setting a function value which is being highlighted on the image processing function list and switch from image processing function list to a basic screen that is different from the function-assigning screen in response to either: (1) pressing the setting key being pressed that is different from all of the operation keys and the setting key, or (2) a predetermined time elapses without pressing an operation key other than the first operation key.

* * * * *